United States Patent
Luo et al.

(10) Patent No.: US 12,417,885 B2
(45) Date of Patent: Sep. 16, 2025

(54) POSITIVE ELECTRODE OF HYBRID CAPACITOR AND MANUFACTURING METHOD THEREFOR AND USE THEREOF

(71) Applicant: EVE ENERGY CO., LTD., Guangdong (CN)

(72) Inventors: Chuiyi Luo, Guangdong (CN); Fang Bu, Guangdong (CN); Yuan Zhu, Guangdong (CN); Zhongzhi Yuan, Guangdong (CN); Jianhua Liu, Guangdong (CN); Jincheng Liu, Guangdong (CN)

(73) Assignee: EVE ENERGY CO., LTD., Guangdong (CN)

( * ) Notice: Subject to any disclaimer, the term of this patent is extended or adjusted under 35 U.S.C. 154(b) by 111 days.

(21) Appl. No.: 18/008,412

(22) PCT Filed: Nov. 16, 2020

(86) PCT No.: PCT/CN2020/128952
§ 371 (c)(1),
(2) Date: Dec. 5, 2022

(87) PCT Pub. No.: WO2022/077685
PCT Pub. Date: Apr. 21, 2022

(65) Prior Publication Data
US 2024/0242897 A1     Jul. 18, 2024

(30) Foreign Application Priority Data
Oct. 16, 2020   (CN) .......................... 202011112353.2

(51) Int. Cl.
*H01G 11/50*     (2013.01)
*H01G 11/06*     (2013.01)
(Continued)

(52) U.S. Cl.
CPC .............. *H01G 11/50* (2013.01); *H01G 11/28* (2013.01); *H01G 11/32* (2013.01); *H01G 11/86* (2013.01); *H01G 11/06* (2013.01)

(58) Field of Classification Search
CPC ........ H01G 11/50; H01G 11/28; H01G 11/32; H01G 11/86; H01G 11/06
(Continued)

(56) References Cited

U.S. PATENT DOCUMENTS

| 5,429,890 A | 7/1995 | Pynenburg |
| 10,586,985 B2 | 3/2020 | Allen et al. |

(Continued)

FOREIGN PATENT DOCUMENTS

| CN | 102203891 A | 9/2011 |
| CN | 103890124 A | 6/2014 |

(Continued)

OTHER PUBLICATIONS

Notice of reasons for refusal dated Sep. 9, 2024 received in Japanese Patent application No. 2022-575357.
(Continued)

*Primary Examiner* — Arun Ramaswamy
(74) *Attorney, Agent, or Firm* — HUNTON ANDREWS KURTH LLP

(57) ABSTRACT

The present invention relates to a positive electrode of a hybrid capacitor, a manufacturing method therefor and a use thereof. The positive electrode comprises a current collector, and a bonding layer and a positive electrode material layer sequentially located on a surface of the current collector. The bonding layer comprises a first adhesive. The positive electrode material layer comprises a second adhesive, conductive agents, a positive electrode active substance and a lithium-rich compound. The conductive agents comprise a first conductive agent and a second conductive agent. The
(Continued)

first conductive agent comprises at least one of graphite powder, conductive carbon black or acetylene black. The second conductive agent comprises at least one of a graphene material and a one-dimensional carbon material.

16 Claims, 1 Drawing Sheet

(51) Int. Cl.
    *H01G 11/28*     (2013.01)
    *H01G 11/32*     (2013.01)
    *H01G 11/86*     (2013.01)

(58) Field of Classification Search
    USPC .................................. 361/301.1, 502, 503
    See application file for complete search history.

(56) References Cited

U.S. PATENT DOCUMENTS

| | | | |
|---|---|---|---|
| 2011/0157773 | A1 | 6/2011 | Sasaki |
| 2013/0266858 | A1* | 10/2013 | Inoue ................ H01G 11/50 |
| | | | 427/126.3 |
| 2016/0012981 | A1* | 1/2016 | Inoue ................ H01M 4/386 |
| | | | 429/231.1 |
| 2016/0093922 | A1 | 3/2016 | Endo |
| 2017/0194106 | A1* | 7/2017 | Majima ............ H01G 9/0425 |
| 2018/0204686 | A1* | 7/2018 | Yamauchi ........... H01G 11/50 |
| 2019/0020030 | A1* | 1/2019 | Umetsu ............. H01G 11/52 |
| 2019/0355982 | A1* | 11/2019 | Lin ................... H01G 11/46 |
| 2020/0220176 | A1 | 7/2020 | Yamakawa |

FOREIGN PATENT DOCUMENTS

| | | |
|---|---|---|
| CN | 105161309 A | 12/2015 |
| CN | 105489395 A | 4/2016 |
| CN | 105552344 A | 5/2016 |
| CN | 105870452 A | 8/2016 |
| CN | 106654177 A | 5/2017 |
| CN | 106847520 A | 6/2017 |
| CN | 107528050 A | 12/2017 |
| CN | 108428867 A | 8/2018 |
| CN | 108735526 A | 11/2018 |
| CN | 108766781 A | 11/2018 |
| CN | 109300698 A | 2/2019 |
| CN | 108987672 B | 3/2020 |
| CN | 111149238 A | 5/2020 |
| CN | 111164801 A | 5/2020 |
| EP | 0977219 A2 | 2/2000 |
| EP | 3279251 A1 | 2/2018 |
| JP | 2000106218 A | 4/2000 |
| JP | 2001351688 A | 12/2001 |
| JP | 2005183806 A | 7/2005 |
| JP | 2006128049 A | 5/2006 |
| JP | 2009043514 A | 2/2009 |
| JP | 2015088268 A | 5/2015 |
| JP | 2016186910 A | 10/2016 |
| JP | 2019212909 A | 12/2019 |
| WO | 20170126687 A1 | 7/2017 |
| WO | 2018140367 A1 | 8/2018 |

OTHER PUBLICATIONS

Extended European search report dated Aug. 20, 2024 received in European application No. 20957461.5.
First Office Office Action dated Jun. 16, 2021 issued in CN 202011112353.2.
International Search Report dated Jul. 19, 2021 issued in PCT/CN2020/128952.
Notice of Reasons for Refusal dated Mar. 12, 2020 issued in Japanese Publication No. 2022-575357.
Partial supplementary European search report dated Jan. 23, 2024 issued in EP20957461.5.

* cited by examiner

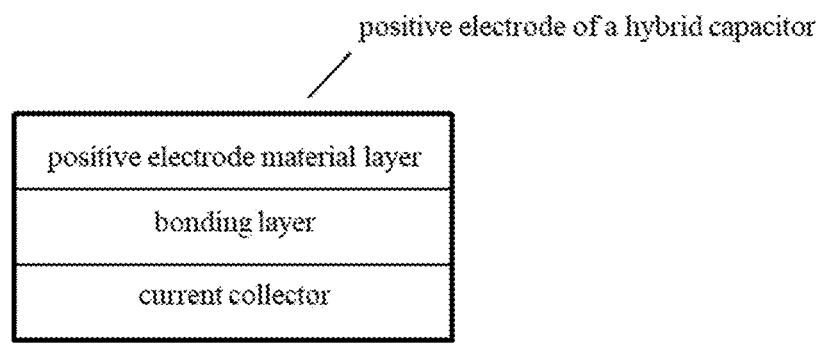

POSITIVE ELECTRODE OF HYBRID CAPACITOR AND MANUFACTURING METHOD THEREFOR AND USE THEREOF

TECHNICAL FIELD

The present application belongs to the technical field of hybrid capacitors, and relates to a positive electrode of a hybrid capacitor, a preparation method therefor and use thereof.

BACKGROUND

With the increasingly prominent problems of energy and environment, clean energy and renewable energy are widely studied and utilized. As a novel type of high-efficiency energy storage element between conventional capacitors and secondary batteries, supercapacitors have been widely studied and concerned. Among the supercapacitors, carbon-based supercapacitors, which adopt carbon materials as the main electrode material, are widely used; activated carbon is one of the commonly used carbon materials, but the specific capacitance of activated carbon is generally between 25-35 F/g, and the compaction density is only 0.5-0.6 g/m$^2$; for the capacitors using pure activated carbon as electrodes, the energy density of the capacitors is only 2-10 Wh/kg and has a severe limitation. Additionally, the activated carbon electrode is mainly obtained by preparing the activated carbon into aqueous slurry, coating the slurry on the foil surface and drying and rolling the sheet; since the activated carbon has a strong adsorption capacity, the residual moisture is difficult to remove from the activated carbon electrode, which in turn affects the voltage and discharge performance of the device. Therefore, research focus is transferred to hybrid capacitors, in which lithium ion capacitors have the advantages of high energy density and power density, high electrostatic capacity and longer cycle life than lithium ion batteries, and are expected to be widely used in the fields of new energy vehicles, wind energy and the Internet of Things.

At present, in order to obtain high energy density and improve the negative electrode potential, the negative electrode of lithium ion capacitors generally needs pre-lithium intercalation treatment. CN104538194A discloses a preparation method of a lithium ion capacitor (LIC) using a pre-lithiated hard carbon negative electrode, in which commercial activated carbon serves as a positive electrode, hard carbon serves as the negative electrode and 1 M LiPF$_6$EC+DEC solution serves as an electrolyte to assemble the LIC. For the LIC with a lithium intercalation volume of 400 mAh/g, the highest energy density and power density are 76.5 Wh/kg and 5.1 kW/kg respectively, and an energy retention rate is still as high as 92.0% after 1000 cycles. The lithium ion capacitor after 15 hours of prelithiation has the energy density reaching 97.2 Wh/kg, and the smallest impedance and good cycle performance (after 1000 cycles at a current density of 1 A/g, the energy retention rate is 91.2%). When a mass ratio of the positive electrode and the negative electrode is 2.2, the energy retention rate is 57.0%. Meanwhile, the capacitor has quite small charge transfer internal resistance (10.4), and the maximum energy density and the maximum power density are 88.7 Wh/kg and 12 kW/kg, respectively. However, the preparation method provided by this invention is relatively complex, time-consuming, and costly, and cannot meet the requirements of the Internet of Things power supplies on rate capability and energy density.

CN104617335A discloses a low-temperature chemical power supply and a production method thereof, and the production method includes the following steps: 1) preparing a battery cell, welding tabs, packaging the battery cell into a shell, and drying; 2) packaging the battery cell into a shell, and carrying out drying and completing a primary liquid charging; 3) conducting formation treatment on a lithium ion capacitor or a lithium ion battery; 4) conducting secondary liquid charging on the battery cell after formation; 5) conducting shaping on the battery cell, and carrying out follow-up treatment. This invention adopts twice liquid charging, in which the primary liquid charging is used for film formation, and the secondary liquid charging is used for improving the electric conductivity and the low-temperature characteristic of the device.

Although this invention improves the low-temperature performance of the chemical power supply, it still cannot satisfy the requirements of the Internet of Things power supplies on the operation temperature of −40° C.-125° C.

Based on the research of the above documents, it has become an urgent problem to be solved how to develop a hybrid capacitor with high energy density, good rate capability, prelithiation-free negative electrode and low cost to satisfy the application of Internet of Things power supplies.

SUMMARY

An object of the present application is to provide a positive electrode of a hybrid capacitor, a preparation method therefor and use thereof. By improving the conventional positive electrode formulation and process, the positive electrode of a hybrid capacitor solves the problems that carbon-based capacitors have low energy density and the negative electrode requires pre-lithium intercalation treatment, improves the device in energy density and rate capability, and can meet the requirements of high-rate pulse discharge at −40° C.-125° C. The method of the present application particularly improves the rate capability of positive electrode at both room temperature and low temperature, realizes the prelithiation-free negative electrode, and reduces the production cost.

In order to achieve the object, the present application adopts the following technical solutions.

In a first aspect, the present application provides a positive electrode of a hybrid capacitor, and the positive electrode includes a current collector, and a bonding layer and a positive electrode material layer sequentially located on a surface of the current collector, the bonding layer includes a first binder, and the positive electrode material layer includes a second binder, a conductive agent, a positive electrode active substance and a lithium-rich compound.

By arranging the bonding layer between the current collector and the positive electrode material layer, the positive electrode provided by the present application improves the bonding capacity of the positive electrode material and the current collector, and reduces the internal resistance of electrode sheet; the lithium-rich compound and the positive electrode active substance provide lithium ions to enter the negative electrode during the charging process and perform lithium intercalation, which allows the negative electrode to be freed from the prelithiation step; the above materials cooperate with each other, improving the rate capability of the positive electrode and satisfying the requirements of high-rate charge and discharge.

Optionally, a thickness of the bonding layer is 0.5-10 µm, such as 0.5 µm, 1 µm, 2 µm, 4 µm, 6 µm, 8 µm, 9 µm or 10 µm, optionally 1-5 µm. If the thickness is less than 0.5 µm, the bonding layer will have small binding capacity for the powder materials, which cannot effectively reduce the resistance of the electrode sheet or prevent the powder materials from falling off; if the thickness is more than 10 μm, the electrode sheet will have large thickness, which is not conducive to improving the energy density of the device.

Optionally, the conductive agent includes a first conductive agent and a second conductive agent, the first conductive agent includes at least one of graphite powders, conductive carbon black or acetylene black, and the second conductive agent includes at least one of a graphene-based material and a one-dimensional carbon material. In the positive electrode material layer, the graphene-based material and/or the one-dimensional carbon material build a three-dimensional conductive network, and particles from at least one of graphite powders, conductive carbon black or acetylene black are dispersed in the interior and/or on the surface of the conductive network, which form a conductive perfect system and improve the electrical conductivity of the material.

Optionally, the positive electrode active substance includes a lithium-containing positive electrode active substance and a carbon-based positive electrode active substance.

Optionally, the lithium-containing positive electrode active substance includes any one or a combination of at least two of lithium cobalt oxide, lithium nickel oxide, lithium manganese oxide, lithium iron phosphate, a nickel-cobalt-manganese ternary material, a nickel-cobalt-aluminum ternary material or a nickel-cobalt-manganese-aluminum quaternary material, and the lithium-containing positive electrode active substance is optionally selected from any one or a combination of at least two of lithium nickel oxide, the nickel-cobalt-manganese ternary material, the nickel-cobalt-aluminum ternary material or the nickel-cobalt-manganese-aluminum quaternary material. For the lithium-containing positive electrode active substance, the typical but non-limiting combinations include a combination of lithium cobalt oxide and lithium manganese oxide, a combination of lithium manganese oxide and lithium iron phosphate, a combination of lithium iron phosphate and lithium cobalt oxide, a combination of the nickel-cobalt-manganese ternary material and the nickel-cobalt-aluminum ternary material, and a combination of the nickel-cobalt-aluminum ternary material and the nickel-cobalt-manganese-aluminum quaternary material, and the lithium-containing positive electrode active substance is optionally selected from any one or a combination of at least two of lithium nickel oxide, the nickel-cobalt-manganese ternary material, the nickel-cobalt-aluminum ternary material or the nickel-cobalt-manganese-aluminum quaternary material.

Optionally, the carbon-based positive electrode active substance includes any one or a combination of at least two of activated carbon, graphene, doped graphene or porous biomass carbon.

In the present application, the carbon-based positive electrode active substance has a large specific surface area, generally more than or equal to 1500 $m^2/g$ (such as 1500 $m^2/g$, 1600 $m^2/g$, 1700 $m^2/g$, 1800 $m^2/g$, 2000 $m^2/g$ or 2100 $m^2/g$), and the carbon-based positive electrode active substance can improve the energy density of capacitors after mixed with the lithium-containing positive electrode active substance.

Optionally, the conductive carbon black includes small-particle conductive carbon black with a particle size of 10-200 nm and/or large-particle conductive carbon black with a particle size of 1-30 μm; for example, the particle size of the small-particle conductive carbon black can be 10 nm, 15 nm, 20 nm, 50 nm, 80 nm, 100 nm, 120 nm, 150 nm, 180 nm, 190 nm or 200 nm; the particle size of the large-particle conductive carbon black can be 1 μm, 3 μm, 5 μm, 10 μm, 15 μm, 20 μm, 25 μm, 28 μm or 30 μm.

In the present application, a type of the small-particle conductive carbon black or the large-particle conductive carbon black is not limited specifically, and it may be Super P (SP); all the conventional materials used by those skilled in the art can be applied to the present application.

In the present application, the graphene-based material includes any one or a combination of at least two of graphene, graphene oxide or doped graphene.

Optionally, the one-dimensional carbon material includes carbon nanotubes and/or carbon fibers.

Optionally, the second conductive agent includes at least one of the graphene-based materials and at least one of the one-dimensional carbon materials.

Optionally, a mass ratio of the graphene-based material to the one-dimensional carbon material is (1-2):(3-6) in the positive electrode material layer; with such optional ratio, a super conductive network is formed in the positive electrode material layer and thus an excellent electrical conductivity can be obtained; the mass ratio can be, for example, 1:3, 1:4, 1:5, 1:6, 2:3, 2:5 or 2:6; if the mass ratio is less than 1:6, it is difficult to construct a three-dimensional conductive network in the positive electrode; if the mass ratio is more than 2:3, it is difficult to disperse the graphene-based material, and the internal resistance of the device will increase. It is easy to understand that the graphene-based material can be a component of the second conductive agent or a component of the carbon-based positive electrode active substance, and as long as it is contained in the positive electrode material layer, it is counted in the above content range.

Optionally, the first binder and the second binder are a fusible fluorocarbon resin.

Optionally, the first binder and the second binder are independently selected from any one or a combination of at least two of PVDF, PTFE or PFA, in which the typical but non-limiting combinations include a combination of PVDF and PFA, and a combination of PFA and PTFE. Optionally, the lithium-rich compound includes any one or a combination of at least two of $Li_2NiO_2$, $LiSFeO_4$, $Li_3N$, $Li_2O$, $Li_2O_2$ or an M/lithium fluoride composite, in which the M includes any one or a combination of at least two of Co, Ni or Fe, and the lithium-rich compound is optionally selected from any one or a combination of at least two of $Li_2NiO_2$, $Li_3N$ or the M/lithium fluoride composite. For the lithium-rich compound, the typical but non-limiting combinations include a combination of $Li_2NiO_2$ and $LiSFeO_4$, a combination of $Li_3N$ and $Li_2O$, a combination of $Li_2O$ and $Li_2O_2$, a combination of $Li_3N$, $Li_2O$ and $Li_2O_2$, and a combination of $Li_2NiO_2$ and a Ni/lithium fluoride composite, and any one or a combination of at least two of $Li_2NiO_2$, $Li_3N$ or the M/lithium fluoride composite.

The "M/lithium fluoride composite" is a composite of metal M and lithium fluoride.

As an optional technical solution of the positive electrode of the present application, the bonding layer further includes a third conductive agent, and the third conductive agent is optionally conductive carbon black.

Optionally, based on a total mass of the bonding layer and the positive electrode material layer being 100%, a total mass fraction of the first binder and the second binder is 2-10%, such as 2%, 3%, 5%, 6%, 8% or 10%.

There is no specific limitation on a ratio of the first binder and the second binder, and those skilled in the art can choose according to needs.

Optionally, based on the total mass of the bonding layer and the positive electrode material layer being 100%, a mass fraction of the first conductive agent is 1-6%, such as 1%, 2%, 3%, 4%, 5% or 6%.

Optionally, based on the total mass of the bonding layer and the positive electrode material layer being 100%, a total mass fraction of the graphene-based material and the one-dimensional carbon material is 0.5-3%, such as 0.5%, 1%, 2%, 2.5% or 3%. If the mass fraction is lower than 0.5%, the low-temperature rate capability of the device will be affected; if the mass fraction is higher than 3%, the internal resistance of the device will be increased, and the electrical performance will be affected. It is easy to understand that the graphene-based material can be a component of the second conductive agent or a component of the carbon-based positive electrode active substance, and as long as it is contained in the positive electrode material layer, it is counted in the above content range.

Optionally, a mass ratio of the third conductive agent to the first binder is (1-5):1, such as 1:1, 2:1, 3:1, 4:1 or 5:1, and optionally (2-4):1.

Optionally, based on the total mass of the bonding layer and the positive electrode material layer being 100%, a mass fraction of the lithium-containing positive electrode active substance is 5-80%, such as 5%, 10%, 15%, 20%, 30%, 40%, 50%, 60%, 70% or 80%.

Optionally, based on the total mass of the bonding layer and the positive electrode material layer being 100%, a mass fraction of the carbon-based positive electrode active substance is 10-90%, such as 10%, 20%, 25%, 30%, 40%, 50%, 60%, 70%, 80% or 90%.

Optionally, based on a total mass of the binder and the positive electrode material layer being 100%, a mass fraction of the positive electrode active substance is 85-95%, such as 85%, 88%, 90%, 92%, 93% or 95%.

Optionally, a mass ratio of the lithium-containing positive electrode active substance to the carbon-based positive electrode active substance is 1:(0.5-1.5), such as 1:0.5, 1:0.8, 1:0.9, 1:1, 1:1.2, 1:1.3 or 1:1.5, and optionally 1:(1-1.2).

Optionally, based on the total mass of the bonding layer and the positive electrode material layer being 100%, a mass fraction of the lithium-rich compound is 2-30%, such as 2%, 3%, 5%, 10%, 15%, 20%, 25% or 30%. If the mass fraction is lower than 2%, the capacity and the median discharge voltage of the device are low; if the mass fraction is higher than 30%, the raw material cost of the device increases.

In a second aspect, the present application provides a preparation method for the positive electrode according to the first aspect, including the following steps:

(1) mixing the second binder, the conductive agent, the positive electrode active substance and the lithium-rich compound to obtain a positive electrode slurry, in which the conductive agent includes a first conductive agent and a second conductive agent, the first conductive agent includes at least one of graphite powders, conductive carbon black or acetylene black, and the second conductive agent includes at least one of a graphene-based material and a one-dimensional carbon material;

(2) coating a dispersion liquid containing the first binder on a surface of the current collector, performing a first baking to prepare the bonding layer, then coating the positive electrode slurry obtained in step (1) on a surface of the bonding layer, and performing a second baking, so as to obtain an intermediate product;

(3) rolling the intermediate product obtained in step (2), and performing a third baking, so as to obtain the positive electrode.

In the preparation method provided in the present application, by coating the dispersion liquid of the first binder on a surface of the positive electrode current collector and then rolling and baking the same, various positive electrode materials and the current collector are bonded more closely, reducing the internal resistance of electrode sheet, and improving the charge-discharge performance at high power; the first conductive agent and the second conductive agent build a three-dimensional conductive network; the lithium-rich compound and the positive electrode active substance provide lithium ions to enter the negative electrode during the charging process and perform lithium intercalation, which allows the negative electrode to be freed from pre-lithiation, simplifies the process, reduces the production cost, and has a high application value.

A mixing method of the positive electrode slurry in step (1) is not limited specifically in the present application, and it may be one-step mixing or step-by-step mixing, such as two steps, three steps and four steps; those skilled in the art can perform preparation according to needs.

Optionally, materials except the graphene-based material are mixed in dry to obtain mixed powders, then the graphene-based material is mixed with the mixed powders, and finally an organic solvent is added and mixed uniformly, so as to obtain the positive electrode slurry.

In the present application, a type of the organic solvent is not limited specifically, and all the conventional organic solvents used by those skilled in the art can be applied to the present application.

Optionally, the current collector in step (2) includes any one of an etched current collector, a coated current collector, a pure current collector or a through-hole current collector.

Optionally, a mass fraction of the binder is 1-10% in the dispersion liquid in step (2), such as 1%, 3%, 5%, 8%, 9% or 10%, and optionally 2-8%.

Optionally, the dispersion liquid in step (2) further includes a third conductive agent. Optionally, a temperature of the first baking in step (2) is 60-180° C., such as 60° C., 70° C., 75° C., 80° C., 85° C., 90° C., 100° C., 120° C., 140° C., 160° C., 170° C. or 180° C., and optionally 80-150° C.; if the temperature is lower than 60° C., the organic solvent cannot be removed; if the temperature is higher than 180° C., the electrode sheet may crack.

Optionally, a thickness of the bonding layer in step (2) is 0.5-10 µm, such as 0.5 µm, 1 µm, 2 µm, 4 µm, 6 µm, 8 µm, 9 µm or 10 µm, and optionally 1-5 µm; if the thickness is less than 0.5 µm, the conductive bonding layer will have small binding capacity for the powder materials, which cannot effectively reduce the resistance of the electrode sheet or prevent the powder materials from falling off; if the thickness is more than 10 µm, the electrode sheet will have large thickness, which is not conducive to improving the energy density of the device.

Optionally, a temperature of the second baking in step (2) is 80-150° C., such as 80° C., 85° C., 90° C., 100° C., 110° C., 120° C., 130° C., 140° C. or 150° C., and optionally 100-130° C.; if the temperature is lower than 80° C., the residual solvent and moisture of the electrode sheet cannot be removed; if the temperature is higher than 150° C., the electrode sheet will be over-baked and the powders may fall off.

Optionally, in the process of step (1) and step (2), an environment temperature is controlled at 20-30° C., and a humidity is controlled at 3-40%; for example, the temperature can be 20° C., 22° C., 25° C., 26° C., 28° C. or 30° C., and the humidity can be 3%, 5%, 8%, 10%, 15%, 20%, 25%, 30%, 35% or 40%.

Optionally, a speed of the rolling in step (3) is 2-50 m/min, such as 2 m/min, 5 m/min, 10 m/min, 20 m/min, 25 m/min, 30 m/min, 35 m/min, 40 m/min, 45 m/min, 48 m/min or 50 m/min; if the speed is less than 2 m/min, the production efficiency of electrode sheets is low; if the speed is more than 50 m/min, the bonding layer and the slurry cannot be bonded well.

Optionally, a method of the rolling in step (3) is a cold rolling and/or a hot rolling.

Optionally, a temperature of the cold rolling is 0-45° C., such as 0° C., 5° C., 10° C., 15° C., 20° C., 30° C., 40° C. or 45° C.

Optionally, a temperature of the hot rolling is 60-270° C., such as 60° C., 70° C., 80° C., 90° C., 100° C., 110° C., 120° C., 130° C., 140° C., 160° C., 180° C., 190° C., 200° C., 230° C., 250° C. or 270° C., optionally 80-250° C.; if the temperature is lower than 60° C., the binder in the bonding layer cannot be hot-melted, which is not conducive to the bonding capacity; if the temperature is higher than 270° C., the structure of the binder may be damaged.

Optionally, a method of the third baking in step (3) includes a vacuum baking.

Optionally, a vacuum degree of the vacuum baking is 5-200 Pa, such as 5 Pa, 10 Pa, 15 Pa, 20 Pa, 50 Pa, 80 Pa, 100 Pa, 150 Pa, 180 Pa or 200 Pa.

Optionally, a temperature of the third baking in step (3) is 80-150° C., such as 80° C., 90° C., 100° C., 110° C., 120° C., 130° C., 135° C., 140° C., 145° C. or 150° C.

Optionally, a time of the third baking in step (3) is 10-60 min, such as 10 min, 20 min, 30 min, 40 min, 50 min or 60 min.

Optionally, the preparation method includes the following steps:
(1) mixing the first conductive agent, the second binder, the second conductive agent, the positive electrode active substance and the lithium-rich compound in dry state for 1-3 h, then adding 0.5-3 wt % of the third conductive agent and stirring the mixture for 1-2 h, and then adding an organic solvent and stirring the mixture for 4-6 h, so as to obtain a positive electrode slurry;
(2) coating a dispersion liquid containing the first binder on a surface of the current collector, performing a baking at 60-180° C. to prepare the bonding layer, controlling a thickness of the bonding layer at 0.5-10 μm, then coating the positive electrode slurry obtained in step (1) on a surface of the bonding layer, and performing a baking at 80-150° C., so as to obtain an intermediate product;
(3) subjecting the intermediate product obtained in step (2) to a hot rolling with a rolling speed controlled at 2-50 m/s and a temperature controlled at 60-270° C., performing a baking at 80-150° C. with a vacuum degree of 5-200 Pa for 10-60 min, so as to obtain the positive electrode;
in the method, both step (1) and step (2) are performed in an environment with a temperature of 20-30° C. and a humidity of 3-40%.

In a third aspect, the present application further provides a hybrid capacitor, and the hybrid capacitor includes the positive electrode according to the first aspect.

The hybrid capacitor provided by the present application adopts the positive electrode according to the first aspect, the positive electrode includes a current collector, and a bonding layer and a positive electrode material layer sequentially located on a surface of the current collector; a lithium-rich compound and a positive electrode active substance in the positive electrode material layer can provide lithium ions to enter the negative electrode during the charging process, realizing the prelithiation-free negative electrode, so that the hybrid capacitor has simple preparation process and low cost; meanwhile, the energy density and rate capability are improved, which satisfies the needs for Internet of Things power supplies.

Compared with the related techniques, the present application has at least the following beneficial effects:
(1) The present application provides a positive electrode, including a current collector, and a bonding layer and a positive electrode material layer sequentially located on a surface of the current collector; the bonding layer improves the bonding capacity of the current collector and the positive electrode material layer, and reduces the internal resistance of electrode sheet; a conductive agent, a lithium-rich compound and a positive electrode active substance in the positive electrode material layer cooperate with each other to improve the energy density and rate capability of the positive electrode, and meanwhile, the positive electrode material layer provides lithium ions to enter the negative electrode during the charging process, realizing the prelithiation-free negative electrode.
(2) In a preparation method of the positive electrode provided in the present application, by coating a dispersion liquid of a first binder on a surface of the positive electrode current collector and then rolling and baking the same, various positive electrode materials and the current collector are bonded more closely, reducing the internal resistance of electrode sheet, and improving the charge-discharge performance at high power; a first conductive agent and a second conductive agent build a three-dimensional conductive network; a lithium-rich compound and a positive electrode active substance provide lithium ions to enter the negative electrode during the charging process and perform lithium intercalation, which allows the negative electrode to be freed from prelithiation, simplifies the process, reduces the production cost, and facilitates to the industrialization.
(3) A hybrid capacitor provided by the present application adopts a positive electrode including a current collector, and a bonding layer and a positive electrode material layer sequentially located on a surface of the current collector, so that the energy density of the capacitor is improved, the rate capability is improved, and the negative electrode is freed from prelithiation, which satisfies the needs for Internet of Things power supplies.

BRIEF DESCRIPTION OF THE DRAWINGS

FIG. 1 shows a positive electrode of a hybrid capacitor.

DETAILED DESCRIPTION

The technical means adopted by the present application to achieve the predetermined technical effect are further described below through specific embodiments, and the specific embodiments of the present application will be described in detail below.

A type of the current collector is not limited in the embodiments of the present application, and may be an etched current collector, a coated current collector, a pure current collector or a through-hole current collector, in which the etched current collector is an etched aluminum foil which can be purchased commercially or prepared by etching an aluminum foil, and the specific method of etching the aluminum foil belongs to the prior art, and those skilled in the art can refer to the method disclosed in the prior art for preparation; the coated current collector is a carbon-coated aluminum foil.

Example 1

This example provides a positive electrode of a hybrid capacitor, and the positive electrode includes a current collector, and a bonding layer and a positive electrode material layer sequentially located on a surface of the current collector; the bonding layer is composed of a first binder (specifically composed of polytetrafluoroethylene (PTFE), with a thickness of 1 μm), the positive electrode material layer includes a second binder (specifically composed of polyvinylidene fluoride (PVDF)), a conductive agent, a positive electrode active substance and a lithium-rich compound, and the conductive agent includes a first conductive agent and a second conductive agent, the first conductive agent is graphite powders, and the second conductive agent is a mixture of graphene and carbon nanotubes with a mass ratio of 1:4; the positive electrode active substance is a mixture of activated carbon and lithium cobalt oxide; the lithium-rich compound is $Li_2NiO_2$;

wherein, based on a total mass of the bonding layer and the positive electrode material layer being 100%, a total mass fraction of the first binder and the second binder is 5 wt %; a mass fraction of the first conductive agent is 4%, and a mass fraction of the second conductive agent is 1%; a mass fraction of lithium cobalt oxide is 45 wt %, a mass fraction of activated carbon is 40 wt %, and a mass fraction of the lithium-rich compound is 5%.

This example provides a preparation method for the above positive electrode of a hybrid capacitor, including the following steps:
(1) graphite powders, PVDF, activated carbon, lithium cobalt oxide and $Li_2NiO_2$ were mixed in dry state for 3 h, then added with a mixture of graphene and carbon nanotubes and stirred for 2 h, and then added with N-methyl pyrrolidone (NMP) and stirred for 4 h, so as to obtain a positive electrode slurry;
(2) a PTFE dispersion liquid with a mass fraction of 3% was coated on a surface of the current collector, and baked at 90° C. to prepare the bonding layer, a thickness of the bonding layer is controlled at 1 μm, and then the positive electrode slurry obtained in step (1) was coated on a surface of the bonding layer, and baked at 85° C., so as to obtain an intermediate product; (3) the intermediate product obtained in step (2) was subjected to a hot rolling with a rolling speed controlled at 2 m/min and a temperature controlled at 140° C., and baked at 140° C. with a vacuum degree of 5 Pa for 30 min, so as to obtain the positive electrode;
in the method, both step (1) and step (2) were performed at an environment temperature of 25° C. and a humidity of 5%.

Example 2

This example provides a positive electrode of a hybrid capacitor, and the positive electrode includes a current collector, and a bonding layer and a positive electrode material layer sequentially located on a surface of the current collector; the bonding layer is composed of a first binder (specifically composed of PVDF, with a thickness of 0.5 μm), the positive electrode material layer includes a second binder (specifically composed of PTFE), a conductive agent, a positive electrode active substance and a lithium-rich compound, and the conductive agent includes a first conductive agent and a second conductive agent, the first conductive agent is acetylene black, and the second conductive agent is a mixture of graphene oxide and carbon nanotubes with a mass ratio of 2:3; the positive electrode active substance is a mixture of graphene and lithium manganese oxide; the lithium-rich compound is $Li_3N$;

wherein, based on a total mass of the bonding layer and the positive electrode material layer being 100%, a total mass fraction of the first binder and the second binder is 2 wt %; a mass fraction of the first conductive agent is 1%, and a mass fraction of the second conductive agent is 0.5%; a mass fraction of lithium manganese oxide is 84.5 wt %, and a mass fraction of graphene is 10 wt %, and a mass fraction of the lithium-rich compound is 2%.

This example provides a preparation method for the positive electrode of a hybrid capacitor, including the following steps:
(1) acetylene black, PTFE, graphene oxide, lithium manganese oxide and $Li_3N$ were mixed in dry state for 1 h, then added with a mixture of graphene and carbon nanotubes and stirred for 2 h, and then added with NMP and stirred for 5 h, so as to obtain a positive electrode slurry;
(2) a PVDF dispersion liquid with a mass fraction of 8% was coated on a surface of the current collector, and baked at 60° C. to prepare the bonding layer, a thickness of the bonding layer is controlled at 0.5 μm, and then the positive electrode slurry obtained in step (1) was coated on a surface of the bonding layer, and baked at 80° C., so as to obtain an intermediate product;
(3) the positive electrode sheet obtained in step (2) was subjected to a hot rolling with a rolling speed controlled at 2 m/min and a temperature controlled at 90° C., and baked at 80° C. with a vacuum degree of 200 Pa for 30 min, so as to obtain the positive electrode;
in the method, both step (1) and step (2) were performed at an environment temperature of 20° C. and a humidity of 3%.

Example 3

This example provides a positive electrode of a hybrid capacitor, and the positive electrode includes a current collector, and a bonding layer and a positive electrode material layer sequentially located on a surface of the current collector; the bonding layer is composed of a first binder (specifically composed of polyfluoroalkoxy (PFA), with a thickness of 5 μm), the positive electrode material layer includes a second binder (specifically composed of PFA), a conductive agent, a positive electrode active substance and a lithium-rich compound, and the conductive agent includes a first conductive agent and a second conductive agent, the first conductive agent is SP, and the second conductive agent is a mixture of graphene and carbon nanotubes with a mass ratio of 2:4; the positive electrode active substance is a mixture of activated carbon and NCM811; the lithium-rich compound is $Li_2O$;

wherein, based on a total mass of the bonding layer and the positive electrode material layer being 100%, a total mass fraction of the first binder and the second binder is 5 wt %; a mass fraction of the first conductive agent is 3%, and a mass fraction of the second conductive agent is 1.5%; a mass fraction of NCM811 is 35 wt %, a mass fraction of activated carbon is 45 wt %, and a mass fraction of the lithium-rich compound is 10.5%.

This example provides a preparation method for the above positive electrode of a hybrid capacitor, including the following steps:
(1) SP, PFA, carbon fibers, NCM811 and $Li_2O$ were mixed in dry state for 2 h, then added with a mixture of graphene and carbon nanotubes and stirred for 3 h, and then added with NMP and stirred for 5 h, so as to obtain a positive electrode slurry;
(2) a PFA dispersion liquid with a mass fraction of 4% was coated on a surface of the current collector, and baked at 120° C. to prepare the bonding layer, a thickness of the bonding layer is controlled at 5 μm, and then the positive electrode slurry obtained in step (1) was coated on a surface of the bonding layer, and baked at 120° C., so as to obtain an intermediate product;
(3) the positive electrode sheet obtained in step (2) was subjected to a hot rolling with a rolling speed controlled at 25 m/min and a temperature controlled at 150° C., and baked at 120° C. with a vacuum degree of 100 Pa for 20 min, so as to obtain the positive electrode;
in the method, both step (1) and step (2) were performed at an environment temperature of 25° C. and a humidity of 5%.

Example 4

This example provides a positive electrode of a hybrid capacitor, and the positive electrode includes a current collector, and a bonding layer and a positive electrode material layer sequentially located on a surface of the current collector; the bonding layer includes a first binder and a third conductive agent (specifically, the first binder is composed of PTFE, the third conductive agent is SP, and a thickness is 3 μm), the positive electrode material layer includes a second binder (specifically composed of PVDF), a conductive agent, a positive electrode active substance and a lithium-rich compound, and the conductive agent includes a first conductive agent and a second conductive agent, the first conductive agent is acetylene black, and the second conductive agent is a mixture of graphene and carbon nanotubes with a mass ratio of 1:6; the positive electrode active substance is a mixture of porous biomass carbon and $LiNi_{0.85}Al_{0.075}Mn_{0.075}O_2$; the lithium-rich compound is a Co/lithium fluoride composite; wherein, based on a total mass of the bonding layer and the positive electrode material layer being 100%, a total mass fraction of the first binder and the second binder is 5 wt %; a mass fraction of the first conductive agent is 2%, a mass fraction of the second conductive agent is 2%, and a mass fraction of the third conductive agent is 6%; a mass fraction of $LiNi_{0.85}Al_{0.075}Mn_{0.075}O_2$ is 50 wt %, a mass fraction of porous biomass carbon is 10 wt %, and a mass fraction of the lithium-rich compound is 25%.

This example provides a preparation method for the above positive electrode of a hybrid capacitor, including the following steps:

(1) acetylene black, PVDF, porous biomass carbon, $LiNi_{0.85}Al_{0.075}Mn_{0.075}O_2$ and the Co/lithium fluoride composite were mixed in dry state for 2 h, then added with a mixture of graphene and carbon nanotubes and stirred for 3 h, and then added with NMP and stirred for 6 h, so as to obtain a positive electrode slurry;
(2) a dispersion liquid of PTFE with a mass fraction of 3% and acetylene black was coated on a surface of the current collector, and baked at 180° C. to prepare the bonding layer, a thickness of the bonding layer is controlled at 3 μm, and then the positive electrode slurry obtained in step (1) was coated on a surface of the bonding layer, and baked at 150° C., so as to obtain an intermediate product;
(3) the positive electrode sheet obtained in step (2) was subjected to a hot rolling with a rolling speed controlled at 50 m/min and a temperature controlled at 200° C., and baked at 150° C. with a vacuum degree of 60 Pa for 10 min, so as to obtain the positive electrode;
in the method, both step (1) and step (2) were performed at an environment temperature of 30° C. and a humidity of 40%.

Example 5

This example provides a positive electrode of a hybrid capacitor, and the positive electrode includes a current collector, and a bonding layer and a positive electrode material layer sequentially located on a surface of the current collector; the bonding layer is composed of a first binder and a third conductive agent (specifically, the first binder is composed of PTFE, the third conductive agent is SP, and a thickness is 4 μm), the positive electrode material layer includes a second binder (specifically composed of PVDF), a conductive agent, a positive electrode active substance and a lithium-rich compound, and the conductive agent includes a first conductive agent and a second conductive agent, the first conductive agent is SP, and the second conductive agent is a mixture of graphene and carbon nanotubes with a mass ratio of 2:5, and the third conductive agent is SP; the positive electrode active substance is a mixture of porous biomass carbon and $LiNi_{0.85}Al_{0.075}Mn_{0.075}O_2$; the lithium-rich compound is an Ni/lithium fluoride composite;

wherein, based on a total mass of the bonding layer and the positive electrode material layer being 100%, a total mass fraction of the first binder and the second binder is 3 wt %; a mass fraction of the first conductive agent is 1%, a mass fraction of the second conductive agent is 1%, and a mass fraction of the third conductive agent is 5%; a mass fraction of $LiNi_{0.85}Al_{0.075}Mn_{0.075}O_2$ is 5 wt %, a mass fraction of porous biomass carbon is 87 wt %, and a mass fraction of the lithium-rich compound is 3%.

This example provides a preparation method for the above positive electrode of a hybrid capacitor, including the following steps:
(1) SP, PVDF, porous biomass carbon, $LiNi_{0.85}Al_{0.075}Mn_{0.075}O_2$ and the Ni/lithium fluoride composite were mixed in dry state for 2 h, then added with a mixture of graphene and carbon nanotubes and stirred for 3 h, and then added with NMP and stirred for 6 h, so as to obtain a positive electrode slurry;
(2) a dispersion liquid of PTFE with a mass fraction of 1% and SP was coated on a surface of the current collector, and baked at 180° C. to prepare the bonding layer, a thickness of the bonding layer is controlled at 10 μm, and then the positive electrode slurry obtained in step (1) was coated on a surface of the bonding layer, and baked at 150° C., so as to obtain an intermediate product;

(3) the positive electrode sheet obtained in step (2) was subjected to a hot rolling with a rolling speed controlled at 50 m/min and a temperature controlled at 270° C., and baked at 150° C. with a vacuum degree of 180 Pa for 10 min, so as to obtain the positive electrode;

in the method, both step (1) and step (2) were performed at an environment temperature of 30° C. and a humidity of 40%.

Example 6

By comparing this example with Example 1, the only difference is that the hot rolling in step (3) is replaced by a cold rolling at 5° C.

Example 7

By comparing this example with Example 1, the only difference is that the hot rolling in step (3) is replaced by a cold rolling at 40° C.

Example 8

By comparing this example with Example 1, the only difference is that a mass ratio of lithium cobalt oxide to activated carbon is 2.5:1 with the same total mass fraction of lithium cobalt oxide and activated carbon as that of Example 1, which is 85%.

Example 9

By comparing this example with Example 1, the only difference is that a mass ratio of lithium cobalt oxide to activated carbon is 2:8 with the same total mass fraction of lithium cobalt oxide and activated carbon as that of Example 1, which is 85%.

Comparative Example 1

By comparing this comparative example with Example 1, the only difference is that no lithium-rich compound $Li_2NiO_2$ is added in the preparation method for the positive electrode provided by this comparative example, while the mass ratio of the other materials in the positive electrode material layer is kept unchanged.

Comparative Example 2

By comparing this comparative example with Example 1, the only difference is that no activated carbon is added in the preparation method for the positive electrode provided by this comparative example, and an equivalent amount of lithium cobalt oxide is used instead.

Comparative Example 3

By comparing this comparative example with Example 1, the only difference is that no mixture of graphene and carbon nanotubes is added in the preparation method for the positive electrode provided by this comparative example, and an equivalent amount of graphite powders is used instead.

Comparative Example 4

By comparing this comparative example with Example 1, the only difference is that no bonding layer is arranged, while a content of the binder in the positive electrode material layer is equal to the total amount of the first binder and the second binder in Example 1.

Performance evaluation of hybrid capacitor The positive electrodes of a hybrid capacitor were prepared according to the above examples and the comparative examples, and assembled with a graphite negative electrode into capacitors; a capacity test, a rate capability test at room temperature and a −40° C. low temperature test were performed, and the test methods are described below.

Capacity test: the hybrid capacitor was placed in the environment of 25° C. and stood for 5 min, and the hybrid capacitor was charged to 3.9 V at 5 mA by constant-current constant-voltage charging with a cut-off current of 0.5 mA; the hybrid capacitor stood for 5 min, and discharged to 2.2 V at a constant current of 5 mA, and the test was completed.

Rate capability test: the hybrid capacitor was placed in the environment of 25° C. and charged to 3.68 V at 5 mA by constant-current constant-voltage charging with a cut-off current of 0.5 mA in a Neware 5V5A precision discharge cabinet; the hybrid capacitor stood for 5 min, and was discharged at 500 C rate for 1 s by pulse discharge, the lowest voltage was recorded, and the test was completed.

−40° C. low temperature test: the hybrid capacitor was placed in the environment of 25° C. and charged to 3.68 V at 5 mA by constant-current constant-voltage charging with a cut-off current of 0.5 mA in a 5V5A precision discharge cabinet; the hybrid capacitor was transferred to a high and low temperature cabinet at −40° C. and stood for 6 h, and then was discharged at 150 C rate for 0.1 s by pulse discharge, the lowest voltage was recorded, and the test was completed.

The batteries prepared in the examples and comparative examples of the present application have the same model (15500), and the higher the capacity, the higher the energy density.

The test results are shown in Table 1.

TABLE 1

| | Capacity (mAh) | 25° C.&500 C Voltage (V) | −40° C.&150 C Voltage (V) |
|---|---|---|---|
| Example 1 | 30 | 3.0 | 2.55 |
| Example 2 | 35 | 2.9 | 2.45 |
| Example 3 | 40 | 3.1 | 2.6 |
| Example 4 | 50 | 2.6 | 2.45 |
| Example 5 | 10 | 3.5 | 2.9 |
| Example 6 | 30 | 3.0 | 2.55 |
| Example 7 | 30 | 3.0 | 2.55 |
| Example 8 | 32 | 3.0 | 2.5 |
| Example 9 | 15 | 3.1 | 2.75 |
| Comparative Example 1 | 27 | 2.8 | 2.4 |
| Comparative Example 2 | 55 | 2.4 | 2.15 |
| Comparative Example 3 | 29 | 2.7 | 2.25 |
| Comparative Example 4 | 30 | 2.85 | 2.3 |

Note:
In the table, the "25° C.&500 C Voltage" refers to the lowest voltage measured at 25° C. and with a current of 500 C; the "−40° C.&150 C Voltage" refers to the lowest voltage measured at −40° C. and with a current of 150 C.

The higher the 25° C.&500 C voltage and the −40° C.&150 C voltage, the better the rate capability of the material.

The points below can be seen from Table 1.
(1) Combining Example 1 and Comparative Example 1, it can be seen that the positive electrode of Comparative Example 1 contains no $Li_2NiO_2$, and the capacity and rate capability are both reduced, which indicates that the positive electrode containing $Li_2NiO_2$ is conducive to improving the hybrid capacitor in the energy density, and rate capability at room temperature and low temperature.

(2) Combining Example 1 and Comparative Example 2, it can be seen that the positive electrode active substance of Comparative Example 2 includes lithium cobalt oxide only, and although the capacity is high, the rate capability is poor, which indicates that the positive electrode containing activated carbon and lithium cobalt oxide is conducive to reconciling the rate capability at room temperature and low temperature with good energy density for the hybrid capacitor.

(3) Combining Example 1 and Comparative Example 3, it can be seen that the positive electrode of Comparative Example 3 contains no mixture of graphene and carbon nanotubes but graphite powders instead, resulting in a decrease in capacity and rate capability, which indicates that the positive electrode containing the mixture of graphene and carbon nanotubes is conducive to improving the hybrid capacitor in the energy density, and rate capability at room temperature and low temperature.

(4) Combining Example 1 and Comparative Example 4, it can be seen that no bonding layer is arranged in Comparative Example 4, leading to a decrease in rate capability, which indicates that the bonding layer arranged between the positive electrode material layer and the current collector is conducive to improving the hybrid capacitor in the rate capability at room temperature and low temperature.

(5) Combining Example 1, Example 8 and Example 9, it can be seen that the addition amount of lithium-containing positive electrode active substance and carbon-based active substance has an important effect on the capacity and rate capability of the material, and the mass ratio of the lithium-containing positive electrode active substance and the carbon-based active substance controlled at an optional range of 1:(0.5-1.5) can serve both the capacity and rate capability better.

The applicant has stated that although the detailed structural features of the present application are described through the above embodiments in the present application, the present application is not limited to the above detailed structural features, which means that the present application is not necessarily rely on the above detailed structural features to be implemented.

What is claimed is:

1. A positive electrode of a hybrid capacitor, comprising a current collector, and a bonding layer and a positive electrode material layer sequentially located on a surface of the current collector;
   the bonding layer comprises a first binder, and the positive electrode material layer comprises a second binder, a conductive agent, a positive electrode active substance and a lithium-rich compound;
   wherein the positive electrode active substance comprises a lithium-containing positive electrode active substance and a carbon-based positive electrode active substance;
   a mass ratio of the lithium-containing positive electrode active substance to the carbon-based positive electrode active substance is 1:(0.5-1.5);
   the lithium-rich compound comprises any one or a combination of at least two of $Li_2NiO_2$, $Li_5FeO_4$, $Li_3N$, $Li_2O$, $Li_2O_2$ or an M/lithium fluoride composite, wherein the M comprises any one or a combination of at least two of Co, Ni or Fe.

2. The positive electrode according to claim 1, wherein a thickness of the bonding layer is 0.5-10 μm.

3. The positive electrode according to claim 1, wherein the conductive agent comprises a first conductive agent and a second conductive agent, the first conductive agent comprises at least one of graphite powders, conductive carbon black or acetylene black, and the second conductive agent comprises at least one of a graphene-based material and a one-dimensional carbon material.

4. The positive electrode according to claim 1, wherein a thickness of the bonding layer is 1-5 μm;
   optionally, the lithium-containing positive electrode active substance comprises any one or a combination of at least two of lithium cobalt oxide, lithium nickel oxide, lithium manganese oxide, lithium iron phosphate, a nickel-cobalt-manganese ternary material, a nickel-cobalt-aluminum ternary material or a nickel-cobalt-manganese-aluminum quaternary material, and the lithium-containing positive electrode active substance is optionally selected from any one or a combination of at least two of lithium nickel oxide, the nickel-cobalt-manganese ternary material, the nickel-cobalt-aluminum ternary material or the nickel-cobalt-manganese-aluminum quaternary material;
   optionally, the carbon-based positive electrode active substance comprises any one or a combination of at least two of activated carbon, graphene, doped graphene or porous biomass carbon.

5. The positive electrode according to claim 3, wherein the conductive carbon black comprises small-particle conductive carbon black with a particle size of 10-200 nm and/or large-particle conductive carbon black with a particle size of 1-30 μm;
   optionally, the graphene-based material comprises any one or a combination of at least two of graphene, graphene oxide or doped graphene;
   optionally, the one-dimensional carbon material comprises carbon nanotubes and/or carbon fibers;
   optionally, a mass ratio of the graphene-based material to the one-dimensional carbon material is (1-2):(3-6) in the positive electrode material layer.

6. The positive electrode according to claim 1, wherein the bonding layer further comprises a third conductive agent, and the third conductive agent is optionally conductive carbon black;
   optionally, a mass ratio of the third conductive agent to the first binder is (1-5):1, optionally (2-4):1.

7. The positive electrode according to claim 1, wherein, based on a total mass of the bonding layer and the positive electrode material layer being 100%, a total mass fraction of the first binder and the second binder is 2-10%;
   optionally, based on a total mass of the bonding layer and the positive electrode material layer being 100%, a mass fraction of the positive electrode active substance is 85-95%;
   optionally, based on the total mass of the bonding layer and the positive electrode material layer being 100%, a mass fraction of the lithium-rich compound is 2-30%.

8. A preparation method for the positive electrode according to claim 1, comprising:
   (1) mixing the second binder, the conductive agent, the positive electrode active substance and the lithium-rich compound to obtain a positive electrode slurry, wherein the conductive agent comprises a first conductive agent and a second conductive agent, the first conductive agent comprises at least one of graphite powders, conductive carbon black or acetylene black, and the second conductive agent comprises at least one of a graphene-based material and a one-dimensional carbon material;

(2) coating a dispersion liquid containing the first binder on a surface of the current collector, performing a first baking to prepare the bonding layer, then coating the positive electrode slurry obtained in step (1) on a surface of the bonding layer, and performing a second baking, so as to obtain an intermediate product;

(3) rolling the intermediate product obtained in step (2), and performing a third baking, so as to obtain the positive electrode.

9. The preparation method according to claim 8, wherein the current collector in step (2) comprises any one of an etched current collector, a coated current collector, a pure current collector or a through-hole current collector;
optionally, a mass fraction of the binder is 1-10% in the dispersion liquid in step (2), optionally 2-8%;
optionally, the dispersion liquid in step (2) further comprises a third conductive agent;
optionally, a temperature of the first baking in step (2) is 60-180° C., optionally 80-150° C.;
optionally, a thickness of the bonding layer in step (2) is 0.5-10 μm, optionally 1-5 μm;
optionally, a temperature of the second baking in step (2) is 80-150° C., optionally 100-130° C.

10. The preparation method according to claim 8, wherein, in the process of step (1) and step (2), an environment temperature is controlled at 20-30° C., and a humidity is controlled at 3-40%.

11. The preparation method according to claim 8, wherein a speed of the rolling in step (3) is 2-50 m/min;
optionally, a method of the rolling in step (3) is a cold rolling and/or a hot rolling;
optionally, a temperature of the cold rolling is 0-45° C.;
optionally, a temperature of the hot rolling is 60-270° C., optionally 80-250° C.;
optionally, a method of the third baking in step (3) comprises a vacuum baking;
optionally, a vacuum degree of the vacuum baking is 5-200 Pa;
optionally, a temperature of the third baking in step (3) is 80-150° C.;
optionally, a time of the third baking in step (3) is 10-60 min.

12. The preparation method according to claim 8, comprising:
(1) mixing the first conductive agent, the second binder, the positive electrode active substance and the lithium-rich compound in dry state for 1-3 h, then adding the second conductive agent and stirring the mixture for 1-2 h, and then adding an organic solvent and stirring the mixture for 4-6 h, so as to obtain a positive electrode slurry;

(2) coating a dispersion liquid containing the first binder on a surface of the current collector, performing a baking at 60-180° C. to prepare the bonding layer, controlling a thickness of the bonding layer at 0.5-10 μm, then coating the positive electrode slurry obtained in step (1) on a surface of the bonding layer, and performing a baking at 80-150° C., so as to obtain an intermediate product; and (3) subjecting the intermediate product obtained in step (2) to a hot rolling with a rolling speed controlled at 2-50 m/min and a temperature controlled at 60-270° C., performing a baking at 80-150° C. with a vacuum degree of 5-200 Pa for 10-60 min, so as to obtain the positive electrode;
wherein both step (1) and step (2) are performed in an environment with a temperature of 20-30° C. and a humidity of 3-40%.

13. A hybrid capacitor, wherein the hybrid capacitor comprises the positive electrode according to claim 1.

14. The positive electrode according to claim 1, wherein the first binder and the second binder are a fusible fluorocarbon resin;
optionally, the first binder and the second binder are independently selected from any one or a combination of at least two of PVDF, PTFE or PFA;
optionally, the lithium-rich compound is optionally selected from any one or a combination of at least two of $Li_2NiO_2$, $Li_3N$ or the M/lithium fluoride composite.

15. The positive electrode according to claim 3, wherein, based on the total mass of the bonding layer and the positive electrode material layer being 100%, a mass fraction of the first conductive agent is 1-6%;
optionally, based on the total mass of the bonding layer and the positive electrode material layer being 100%, a total mass fraction of the graphene-based material and the one-dimensional carbon material is 0.5-3%.

16. The positive electrode according to claim 4, wherein, based on the total mass of the bonding layer and the positive electrode material layer being 100%, a mass fraction of the lithium-containing positive electrode active substance is 5-80%;
optionally, based on the total mass of the bonding layer and the positive electrode material layer being 100%, a mass fraction of the carbon-based positive electrode active substance is 10-90%;
optionally, a mass ratio of the lithium-containing positive electrode active substance to the carbon-based positive electrode active substance is 1:(1-1.2).

* * * * *